US012490017B2

(12) United States Patent
Soronen et al.

(10) Patent No.: US 12,490,017 B2

(45) Date of Patent: Dec. 2, 2025

(54) METHOD AND ARRANGEMENT FOR PRODUCING SOUND IN AN ELECTRONIC DEVICE

(71) Applicant: PS Audio Design Oy, Oulu (FI)

(72) Inventors: Petri Soronen, Oulu (FI); Petteri Luukkanen, Oulu (FI)

( * ) Notice: Subject to any disclaimer, the term of this patent is extended or adjusted under 35 U.S.C. 154(b) by 203 days.

(21) Appl. No.: 18/562,734

(22) PCT Filed: May 24, 2022

(86) PCT No.: PCT/FI2022/050351

§ 371 (c)(1),
(2) Date: Nov. 20, 2023

(87) PCT Pub. No.: WO2022/248768

PCT Pub. Date: Dec. 1, 2022

(65) Prior Publication Data

US 2024/0244366 A1 Jul. 18, 2024

(30) Foreign Application Priority Data

May 26, 2021 (FI) ..................................... 20215622

(51) Int. Cl.

| | |
|---|---|
| ***H04R 1/24*** | (2006.01) |
| ***H04R 9/06*** | (2006.01) |
| ***H04R 17/00*** | (2006.01) |

(52) U.S. Cl.

CPC ................. *H04R 1/24* (2013.01); *H04R 9/06* (2013.01); *H04R 17/00* (2013.01)

(58) Field of Classification Search

CPC ............. H04R 1/24; H04R 9/06; H04R 17/00

See application file for complete search history.

(56) References Cited

U.S. PATENT DOCUMENTS 6,115,475 A 9/2000 Alexander
10,613,485 B2 * 4/2020 Rothkopf ............ A61B 5/0295

(Continued)

FOREIGN PATENT DOCUMENTS

CN 210351617 U 4/2020
EP 0847661 B2 6/1998

(Continued)

OTHER PUBLICATIONS

Notice of Reasons for Rejection for Application No. JP 2023-571985 mailed Feb. 12, 2025 (2 pages).

(Continued)

*Primary Examiner* — Oyesola C Ojo

(74) *Attorney, Agent, or Firm* — Christopher R. Carroll; The Small Patent Law Group LLC

(57) ABSTRACT

An arrangement for producing sound in an electronic device comprises a magnetic vibrator comprising a first part and a second part provided with permanent magnets, and at least one induction coil. The arrangement further comprises a piezoelectric vibrator comprising piezoelectric material for generating audio-frequency vibrations resulting from deformations of the material by supplying to said material a second electrical signal. The magnetic vibrator and the piezoelectric vibrator have a common audio amplifier. Said first and second electrical signal are supplied from the same audio output to the magnetic vibrator and the piezoelectric vibrator.

5 Claims, 1 Drawing Sheet

(56) References Cited

U.S. PATENT DOCUMENTS

Figure 1:
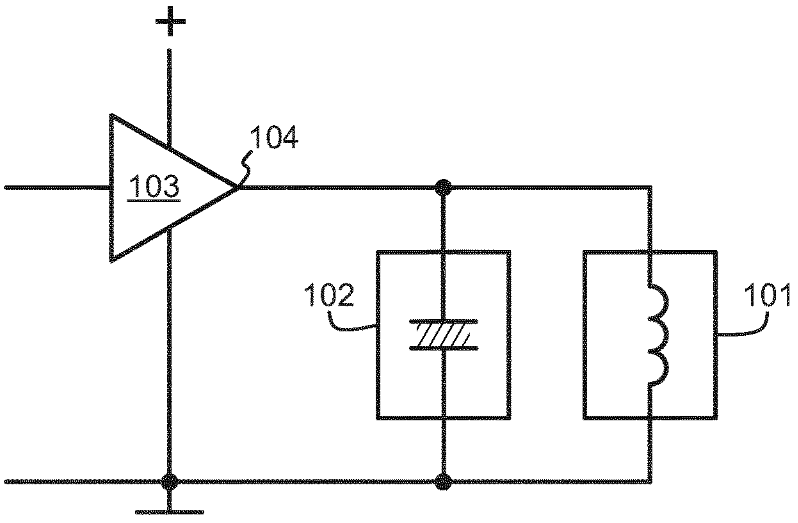

| | | | | |
|---|---|---|---|---|
| 2008/0146890 | A1* | 6/2008 | LeBoeuf .............. | A61B 5/4839 600/300 |
| 2018/0225230 | A1* | 8/2018 | Litichever ............... | G06F 21/56 |
| 2019/0334076 | A1* | 10/2019 | Kim ........................ | B06B 1/045 |
| 2020/0002336 | A1 | 1/2020 | Hert et al. | |
| 2020/0103973 | A1* | 4/2020 | Ahn .................... | H04M 1/0266 |
| 2020/0233629 | A1* | 7/2020 | Yeon ...................... | G10K 9/125 |
| 2020/0260189 | A1* | 8/2020 | Soronen ................... | H04R 9/06 |
| 2022/0345827 | A1* | 10/2022 | Yu .......................... | H04R 9/025 |

FOREIGN PATENT DOCUMENTS

| | | | |
|---|---|---|---|
| EP | 3222055 | A1 | 9/2017 |
| EP | 3603110 | B1 | 9/2020 |
| FI | 20175942 | A1 | 6/2020 |
| FI | 20195599 | A1 | 6/2020 |
| FI | 20205298 | A1 | 12/2020 |
| FI | 20215101 | A1 | 3/2021 |
| JP | WO2011077683 | A1 | 6/2011 |
| JP | 2020150534 | A | 9/2020 |
| JP | 2021500833 | A | 1/2021 |
| WO | 9709842 | A2 | 3/1997 |
| WO | 2016079385 | A1 | 5/2016 |
| WO | 2019081805 | A1 | 5/2019 |

OTHER PUBLICATIONS

Office action for Application No. FI 20215622 mailed Feb. 12, 2025 (10 pages).

Search Report dated Dec. 17, 2021 for corresponding patent application No. 20215622 (2 pages).

International Search Report and Written Opinion for corresponding PCT/FI2022/050351 Sep. 20, 2022 (12 pages).

International Preliminary Report on Patentability for corresponding PCT/FI2022/050351 18.17.2023 (15 pages).

* cited by examiner

METHOD AND ARRANGEMENT FOR PRODUCING SOUND IN AN ELECTRONIC DEVICE

CROSS-REFERENCE TO RELATED APPLICATIONS

This application is a national phase entry of International Patent Application No. PCT/FI2022/050351 (filed 24 May 2022), which claims priority to Finnish Patent Application No. 20215622 (filed 26 May 2021), the entire disclosures of which are incorporated herein by reference.

FIELD OF THE INVENTION

The invention relates to electroacoustic transducers by which an electrical signal is converted into an audible sound. Specifically, the invention proposes how such a transducer can be implemented in a small, portable electronic device in a way that its sound quality will be good and the requirements its sets for an audio amplifier of the device will be reasonable.

BACKGROUND OF THE INVENTION

In portable electronic devices such as smartphones, tablet computers and laptops, small, electromagnetically functioning loudspeakers are generally used for the production of sound. In addition to actual loudspeakers, magnetic vibrators are known, which magnetic vibrators have two parts and both of them comprise one or more permanent magnets, as well as an induction coil. One of the magnetic vibrator's two parts is fastened to some frame part within the device, and the other one is fastened to a cover part, for example to a display, that functions as an acoustic surface, transmitting the vibrations generated by the magnetic vibrator ambient air. The vibrations are generated by supplying an electrical signal to the induction coil, whereby its varying magnetic field together with the fields of the permanent magnets generates forces that displace the parts of the magnetic vibrator relative to each other. Magnetic vibrators within the meaning as intended herein are known for example from the same applicant's prior patent applications such as FI20195599, EP3603110, EP3222055, FI20215101, FI20205298 and FI20175942.

In addition to those listed above, one known way of producing sound in an electronic device is a piezoelectric vibrator. In the piezoelectric vibrator a strip of metal coated with piezoelectric material is fastened inside a cover part, for example a display, of the device. An electrical signal supplied to the piezoelectric material causes in the material quick, reversible deformations, which cause the cover part to vibrate all over so as to function as an acoustic element. The strip of metal serves as a mechanical support for the piezoelectric material which as such is very fragile.

With the known sound production solutions it has proven difficult to achieve a suitable combination of the preferred properties, which include small size, good efficiency at all audio frequencies and affordable controlling electronics. For example, piezoelectric vibrators are often associated with difficult requirements for the controlling electronics, because an audio amplifier driving the piezoelectric vibrator must be capable of producing relatively high voltages.

SUMMARY OF THE INVENTION

An object of the present invention is to be able to produce sound in an electronic device in such a way that the efficiency at all audio frequencies will be good. Another object of the invention is that the parts of the electronic device which are primarily needed for the production of sound will fit in a small space and are affordable to manufacture.

The objects of the invention are achieved by using a common audio amplifier to drive a piezoelectric vibrator as well as a magnetic vibrator.

According to one aspect of the invention, an arrangement for producing sound in an electronic device is provided. The arrangement comprises a magnetic vibrator comprising a first part and a second part provided with permanent magnets, and at least one induction coil for generating audio-frequency vibrations between the first and the second part by supplying to the induction coil a first electrical signal. The arrangement further comprises a piezoelectric vibrator comprising piezoelectric material for generating audio-frequency vibrations resulting from deformations of the material by supplying to said material a second electrical signal, and an audio amplifier common to said magnetic vibrator and piezoelectric vibrator and having an audio output for supplying said first and second electrical signal from said audio output to said magnetic vibrator and piezoelectric vibrator.

According to one embodiment, the arrangement comprises a first part and a second part of said electronic device, whereof said first part is an outer cover or a part of the outer cover of the electronic device. Said first part of the magnetic vibrator may thus be fastened to said first part of the electronic device, and said second part of the magnetic vibrator may be fastened to said second part of the electronic device. This provides the advantage that said parts of the electronic device may be harnessed to participate in the production of sound, even if they would also have other purposes at the same time.

According to one embodiment, said piezoelectric vibrator is fastened to said first part of the electronic device or to another part of the outer cover of the electronic device. This provides the advantage that the part of the outer cover of the electronic device may participate in the production of those sound components which result from deformations of the piezoelectric vibrator.

According to one embodiment, said piezoelectric vibrator is fastened to the same first part of said electronic device as the first part of the magnetic vibrator. Said first and second electrical signal may thereby be supplied from said audio output to said magnetic vibrator and piezoelectric vibrator at opposite polarities, wherein the polarity is determined according to the direction in which a specific polarity of the electrical signal displaces said first part of the electronic device under the action of the magnetic vibrator, on the one hand, and of the piezoelectric vibrator, on the other hand. This provides the advantage that the phase difference present in the vibrations generated by the different vibrators and resulting from the vibrators' capacitive and inductive nature does not have so much effect on the production of sound.

According to one embodiment, said first and second electrical signal are supplied from said audio output to said magnetic vibrator and piezoelectric vibrator without frequency division filtering between them. This provides the advantage that the connection becomes relatively simple and affordable to make.

According to one embodiment, the arrangement comprises a filter bank which is arranged to supply lower-frequency signal components from said audio output to said magnetic vibrator than to said piezoelectric vibrator. This provides the advantage that the frequency properties characteristic of the different vibrator types can be put to the best possible use.

According to one embodiment, the arrangement comprises a limiting impedance connected between said audio output and said piezoelectric vibrator. This provides the advantage that the output of the audio amplifier is better protected against low impedance values present at some frequencies in the piezoelectric vibrator.

According to one embodiment, said limiting impedance is a resistor or a coil. This provides the advantage that it is possible to implement the protection of the audio output by an affordable technology with well-known properties.

LIST OF THE FIGURES

Figure 2:
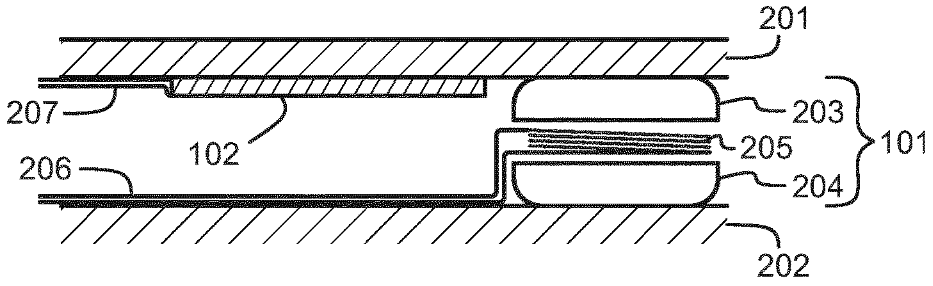
Figure 3:
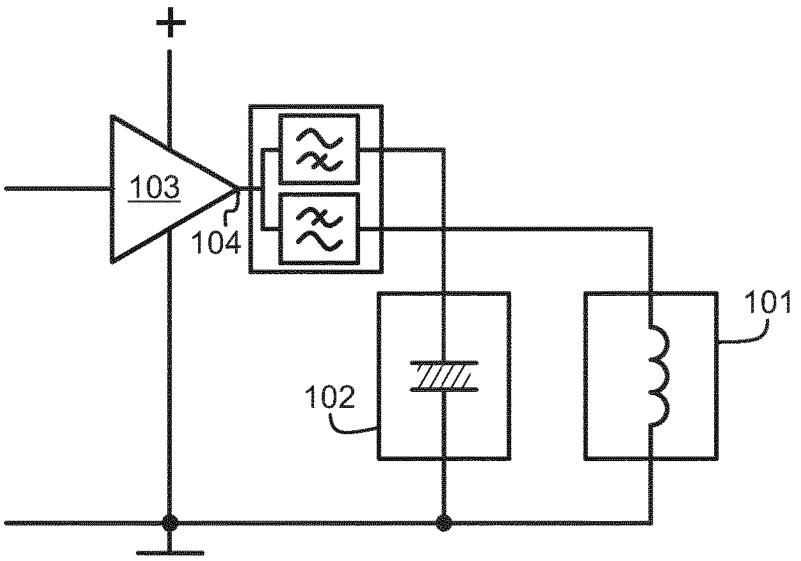
Figure 4:
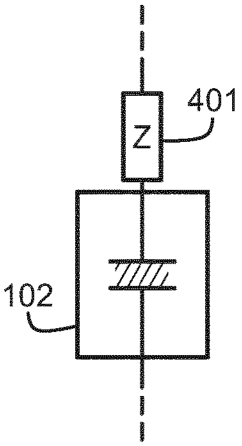

FIG. 1 illustrates one arrangement,
FIG. 2 illustrates one arrangement,
FIG. 3 illustrates one arrangement, and
FIG. 4 illustrates use of a limiting impedance.

DETAILED DESCRIPTION OF THE INVENTION

FIG. 1 schematically illustrates an arrangement for producing sound in an electronic device. The arrangement firstly comprises a magnetic vibrator 101. This term is intended to mean, as described above, an electroacoustic transducer comprising a first part and a second part provided with permanent magnets, and at least one induction coil. The purpose of the magnetic vibrator 101 is to generate audio-frequency vibrations when an electrical signal is supplied to its induction coil. In this text, the electrical signal to be supplied to the induction coil of the magnetic vibrator 101 is referred to as a first electrical signal. The magnetic vibrator appears towards the rest of the electrical circuit primarily as inductance, for which reason a corresponding drawing symbol is used for it in FIG. 1. As to its more specific structure the magnetic vibrator 101 may represent for example any of the types of magnetic vibrator which have been described in the same applicant's prior patent applications FI20195599, EP3603110, EP3222055, FI20215101, FI20205298 and FI20175942.

The arrangement further comprises a piezoelectric vibrator 102. It comprises, in a manner known per se, piezoelectric material for generating audio-frequency vibrations resulting from deformations of the material by supplying to said material an electrical signal. In this text, the electrical signal to be supplied to the piezoelectric vibrator is referred to as a second electrical signal. The piezoelectric vibrator appears towards the rest of the electrical circuit primarily as capacitance, for which reason a drawing symbol derived from the capacitor symbol is used for it in FIG. 1.

In addition to the vibrators 101 and 102 the arrangement comprises an audio amplifier 103. It is common to the magnetic vibrator 101 and to the piezoelectric vibrator 102. In other words, the above-mentioned first and second electrical signal are supplied from the same audio output 104 of the audio amplifier 103 to the magnetic vibrator 101 and to the piezoelectric vibrator 102.

The use of a common audio amplifier for the magnetic vibrator and for the piezoelectric vibrator is based on the realization that the frequency properties of these two vibrator types complement each other. The response of the magnetic vibrator to an audio signal is at its best at low frequencies because of the inductive nature of the magnetic vibrator as an electrical component: its input impedance increases as a function of frequency and is at high frequencies of several kilohertz so high that it is difficult to cause sufficient current to pass through it in order to output a good, high-frequency audio signal. The frequency response of the piezoelectric vibrator is opposite, which is because of its capacitive nature as an electrical component. The typical conditions of the prior art for driving the piezoelectric vibrator at relatively high (over 30 V, even over 100 V) voltages are due to the fact that at lower voltages (10 V or lower), low frequencies in particular cause trouble. When the audio amplifier 103 is common to the magnetic vibrator 101 and to the piezoelectric vibrator 102, the low frequencies in the audio signal output by the audio amplifier are reproduced naturally more through the magnetic vibrator 101 and the high frequencies through the piezoelectric vibrator 102. The configuration as described herein makes it possible that at the audio output 104 of the audio amplifier 103 the voltage amplitude of the signal may well be less than 10 V.

FIG. 2 shows one example of how the magnetic vibrator and the piezoelectric vibrator may be located in an electronic device. The figure illustrates a schematic cross-section of a part of the electronic device comprising a first part 201 and a second part 202. The first part 201 is an outer cover or a part of the outer cover of the electronic device, for example a display, a back panel, a protective screen or the like. If the electronic device is very thin, the second part 202 may be an opposite part of the outer cover. However, the second part 202 may also be some inner part of the electronic device, such as a circuit board or a support frame.

The magnetic vibrator 101 is illustrated in FIG. 2 on the right. A first part 203 thereof is fastened to the first part 201 of the electronic device and a second part 204 thereof is fastened to the second part 202 of the electronic device. The first and the second part 203 and 204 of the magnetic vibrator are shown herein as being clearly separate from each other, such that an induction coil 205 is shown between them. However, this mode of illustration has been chosen for graphical clarity only. In the real magnetic vibrator the first and the second part may be partially within one another and the induction coil may be inside either one of both of them in such a way that it is not seen from outside.

It is often typical of the magnetic vibrator that each of the first and the second part thereof include a respective cover part made from magnetic material, within which cover parts the other parts of the magnetic vibrator such as the permanent magnets and induction coil (s) are located. In this case, the fastening to the first and the second part 201 and 202 of the electronic device as illustrated in FIG. 2 can be implemented such that the cover part of the first part 203 of the magnetic vibrator is fastened from its outer surface to the first part 201 of the electronic device and the cover part of the second part 204 of the magnetic vibrator is fastened from its outer surface to the second part 202 of the electronic device. Such fastening may be direct (e.g. glue or solder fastening) or there may further be a special fastening part therebetween.

The piezoelectric vibrator 102 is illustrated in FIG. 2 on the left. In the embodiment of FIG. 2 the piezoelectric vibrator 102 is fastened to the same first part 201 of the electronic device as the first part 203 of the magnetic vibrator 101. The piezoelectric vibrator 102 could also be fastened to some other part of the outer cover of the electronic device. As such it does not necessarily have to be fastened in particular to the outer cover of the device, but this type of fastening often provides an advantage, because in many cases a part of the outer cover as intended herein can be relatively easily arranged to function as a sufficiently effective acoustic surface. It is typical of the piezoelectric vibrator as intended herein that it is not installed between two parts of the electronic device but is tightly fastened to only one part of the electronic device. Thus the deformations resulting from the electrical signal in the piezoelectric material of the piezoelectric vibrator are transmitted into deformations of that part of the electronic device, producing the desired sound.

The audio amplifier or other electronics of the electronic device are not illustrated in FIG. 2. However, it schematically illustrates conductors 206 and 207 along which the suitable electrical signals may be supplied from the audio output of the audio amplifier to the magnetic vibrator 101 and to the piezoelectric vibrator 102. If the second part 202 of the electronic device is a circuit board, the audio amplifier may naturally be located at some point of that circuit board.

The piezoelectric vibrator 102 and the magnetic vibrator 101 are not necessarily located very close to each other within the electronic device. Their location may be chosen by determining what is the best position for each of them for example in terms of space requirement, assembling and acoustic operation.

If the piezoelectric vibrator 102 and the first part 203 of the magnetic vibrator 101 are fastened to the same first part 201 of the electronic device as in FIG. 2, it is advantageous to pay attention to the polarity of the electrical signals. Either of the capacitor-type piezoelectric vibrator 102 or the coil-type magnetic vibrator 101 are not as such sensitive to the polarity of the signal in the same way as for example diodes. However, the polarity has importance when considering in what direction the electrical signal causes displacement in them. In the magnetic vibrator 101, electric current in one direction through induction coil 205 generates a force pushing the first and the second part 203 and 204 away from each other. Correspondingly, electric current in the opposite direction through the induction coil 205 generates a force pulling the first and the second part 203 and 204 towards each other. In the same way in the piezoelectric vibrator 102 one polarity of the voltage generates deformation in one direction and the other polarity in the opposite direction. These movements cause a corresponding displacement of the first part 201 of the electronic device, which ultimately produces the desired sound.

The capacitive and inductive load generate an opposite phase shift in the oscillating electrical signal. Depending on impedance matching between the signal source and the load, this phase shift may be significant. In order for the displacements of the first part 201 of the electronic device caused by the magnetic vibrator 101 and by the piezoelectric vibrator 102 to rather complement than cancel each other, their fastening and wiring should advantageously be implemented in such a way that the above-described effect of the polarity of the electrical signal resulting from fastening to the first part 201 of the electronic device will be opposite in them. In other words, the polarities should advantageously be selected in such a way that an electrical signal which as such, when supplied to the magnetic vibrator 101, would cause displacement of the first part 201 of the electronic device in the outward direction, would cause as such, when supplied to the piezoelectric vibrator 102, displacement of the first part 201 of the electronic device in the inward direction.

The above-described principle can be defined such that the above-mentioned first and second electrical signal are supplied from the audio output of the audio amplifier to the magnetic vibrator and to the piezoelectric vibrator at opposite polarities. Herein the polarity is thus determined according to the direction in which a specific polarity of the electrical signal displaces said first part of the electronic device by the action of the magnetic vibrator, on the one hand, and of the piezoelectric vibrator, on the other hand.

How, on the one hand, the capacitive nature of the piezoelectric vibrator and, on the other hand, the inductive nature of the magnetic vibrator and the phase difference caused by them affect the displacement of the parts of the electronic device varies significantly, however, depending among other things on whether the vibrators are fastened to the same part of the electronic device, and if they are, how far away from each other they are and what are the other features of the structure. Therefore in some embodiments it may be most advantageous to supply the above-mentioned first and second electrical signal from the audio output of the audio amplifier to the magnetic vibrator and to the piezoelectric vibrator at the same specific polarities.

The oppositely behaving frequency responses of the magnetic vibrator and the piezoelectric vibrator may complement each other so well that said first and second electrical signal may be supplied from the audio output 104 of the audio amplifier 103 to the magnetic vibrator 101 and to the piezoelectric vibrator 102 without frequency division filtering between them. In this case, the natural properties of the vibrators control the propagation of the signal components at different frequencies to a sufficient degree. This principle is illustrated above in FIG. 1.

FIG. 3 shows another possible embodiment. It comprises a filter bank 301 which is arranged to supply lower-frequency signal components from the audio output 104 of the audio amplifier 103 to the magnetic vibrator 101 than to the piezoelectric vibrator 102. The filter bank 301 may as such represent any technique that may be used for discrimination of audio-frequency signal components on the basis of frequency.

Regardless of whether the filter bank is used or not, we can speak of a cutoff frequency or a cutoff frequency range, wherein the magnetic vibrator has a dominant role in the production of lower-frequency sounds than the cutoff frequency or cutoff frequency range and the piezoelectric vibrator has a dominant role in the production of higher-frequency sounds than the cutoff frequency or cutoff frequency range. In connection with the research work for the invention two arrangements were compared, both with similar audio amplifiers and magnetic vibrators, but only one of them also provided with a piezo vibrator. The subjective impression of audible sound was very similar in both arrangements at frequencies below 5 kHz. This was expectable, because at frequencies lower than this the frequency response of a piezo vibrator is particularly disadvantageous for a low-amplitude audio amplifier, and thus the piezo vibrator does not much participate in the production of sound. At frequencies above 5 kHz, the subjective sound quality began to improve in the arrangement comprising the piezo vibrator. For test signals including frequencies above 10 KHz this difference was particularly clear, because when reproduced by the arrangement based on the magnetic vibrator alone, the treble part seemed to be even totally cut off or at least attenuated to a disturbing degree in these test signals.

It depends on the configuration of the piezoelectric vibrator 102 how low its impedance goes at the highest frequencies. On the other hand, it depends on the configuration of the audio amplifier 103 how high a current it may generate to the audio output 104. It is possible to configure the piezoelectric vibrator 102 and/or the audio amplifier 103 in such a way that some intrinsic factor of them functions as a limiter that prevents the audio amplifier 103 from being destroyed by the effect of an excessively high output current, which could be a risk particularly at the highest frequencies. In order to improve the reliability of the arrangement in this respect, it is possible to add to the arrangement a limiting impedance connected between the audio output 104 and the piezoelectric vibrator 102. This is illustrated in FIG. 4, in which a limiting impedance 401 is indicated as Z. The limiting impedance 401 may be for example a resistor or a coil.

The above-described arrangement can also be used for the production of haptic effects. This means that vibrations intended to be perceived by the user's sense of touch are generated by using the same vibrators which are also used for the production of a desired sound. However, it is typical of the haptic effects as intended herein that their frequencies are at most just a few hundred hertz. Thus, only the magnetic vibrator would in practice participate in their production, because these frequencies are too low for the piezoelectric vibrator.

The invention claimed is:

1. An electronic device comprising a first part (201) and a second part (202), whereof said first part (201) is an outer cover or a part of the outer cover of the electronic device, and an arrangement for producing sound in the electronic device, the electronic device comprising:

a magnetic vibrator comprising a third part provided with permanent magnets and fastened to said first part of the electronic device, and a fourth part provided with permanent magnets and fastened to said second part of the electronic device, and at least one induction coil for generating audio-frequency vibrations between the first part and the second part by supplying to the induction coil a first electrical signal;

a piezoelectric vibrator comprising piezoelectric material for generating audio-frequency vibrations resulting from deformations of the material by supplying a second electrical signal to said material;

an audio amplifier common to said magnetic vibrator and said piezoelectric vibrator and having an audio output for supplying said first and second electrical signals from said audio output to said magnetic vibrator and said piezoelectric vibrator;

wherein said piezoelectric vibrator is fastened to the same first part of said electronic device as the third part of the magnetic vibrator, said first and second electrical signals are supplied from said audio output to said magnetic vibrator and said piezoelectric vibrator at opposite polarities, wherein the polarity of each of said first electrical signal and said second electrical signal is determined according to a direction in which the polarity of the corresponding first electrical signal or the second electrical signal displaces said first part of the electronic device under action of the magnetic vibrator and under action of the piezoelectric vibrator.

2. The electronic device according to claim 1, wherein said first and second electrical signals are supplied from said audio output to said magnetic vibrator and said piezoelectric vibrator without frequency division filtering between said first and second electrical signals.

3. The electronic device according to claim 1, further comprising a filter bank which is arranged to supply lower-frequency signal components from said audio output to said magnetic vibrator than to said piezoelectric vibrator.

4. The electronic device according to claim 1, further comprising a limiting impedance connected between said audio output and said piezoelectric vibrator.

5. The electronic device according to claim 1, wherein said limiting impedance is a resistor or a coil.

* * * * *